(12) United States Patent
Hepworth (10) Patent No.: US 11,572,913 B2
(45) Date of Patent: Feb. 7, 2023

(54) OR RELATING TO CONNECTING DEVICES (71) Applicant: Gripple Limited, Sheffield (GB)

(72) Inventor: Robert Hepworth, Sheffield (GB)

(73) Assignee: GRIPPLE LIMITED

( * ) Notice: Subject to any disclaimer, the term of this patent is extended or adjusted under 35 U.S.C. 154(b) by 1030 days.

(21) Appl. No.: 16/307,872

(22) PCT Filed: Jul. 6, 2017

(86) PCT No.: PCT/GB2017/000104
§ 371 (c)(1),
(2) Date: Dec. 6, 2018

(87) PCT Pub. No.: WO2018/011533
PCT Pub. Date: Jan. 18, 2018

(65) Prior Publication Data
US 2019/0211863 A1 Jul. 11, 2019

(30) Foreign Application Priority Data

Jul. 14, 2016 (GB) ..................... 1612234

(51) Int. Cl.
| | |
|---|---|
| F16B 21/02 | (2006.01) |
| F16M 11/04 | (2006.01) |
| F16M 13/02 | (2006.01) |
| F16G 11/10 | (2006.01) |
| F16B 13/10 | (2006.01) |

(52) U.S. Cl.
CPC .............. *F16B 21/02* (2013.01); *F16B 13/10* (2021.08); *F16G 11/108* (2013.01); *F16M 11/041* (2013.01); *F16M 13/027* (2013.01)

(58) Field of Classification Search
CPC ........ F16G 11/108; F16B 13/10; F16B 21/02; F16B 37/046; F16L 3/2431; F16M 13/027; F16M 11/041
See application file for complete search history.

(56) References Cited

U.S. PATENT DOCUMENTS

| | | | |
|---|---|---|---|
| 1,528,777 A | 3/1925 | Marting | |
| 4,263,952 A * | 4/1981 | Kowalski | F16B 37/046 411/116 |
| 5,417,400 A | 5/1995 | Arakawa | |

(Continued)

FOREIGN PATENT DOCUMENTS

| | | |
|---|---|---|
| FR | 2846398 | 4/2004 |
| GB | 972995 | 10/1964 |

*Primary Examiner* — Bradley Duckworth
(74) *Attorney, Agent, or Firm* — Clark Hill PLC; James R. Foley (57) ABSTRACT

A connecting device (10) is provided for connecting a first article (14) to an elongate second article (24). The connecting device (10) comprises a securing arrangement (25) for securing the device (10) to the elongate second article (24), and an attaching arrangement (26) for attaching the connecting device to the first article (14). The attaching arrangement (26) is receivable through an opening (22) in the first article (14). The attaching arrangement (26) comprises a locking arrangement (40) for locking the connecting device (10) to the first article (14). The locking arrangement (40) comprises a detent formation (42) configured to be received by an opening in the first article (14).

15 Claims, 11 Drawing Sheets

(56) References Cited

U.S. PATENT DOCUMENTS

| | | | | |
|---|---|---|---|---|
| 5,655,865 | A * | 8/1997 | Plank | E04D 3/08 |
| | | | | 403/258 |
| 6,923,407 | B2 * | 8/2005 | Takeuchi | H02G 3/32 |
| | | | | 248/68.1 |
| 7,621,487 | B2 * | 11/2009 | Brown | F16B 7/0473 |
| | | | | 248/65 |
| 9,200,660 | B2 * | 12/2015 | Tisol, Jr. | F16B 21/02 |
| 9,458,952 | B2 * | 10/2016 | Zhang | F16B 37/042 |
| 9,556,614 | B2 * | 1/2017 | Van Dore | E04B 9/0478 |
| 10,883,569 | B2 * | 1/2021 | Giemza | F16G 11/106 |
| 2015/0030386 | A1 * | 1/2015 | Carnevali | F16B 7/187 |
| | | | | 403/348 |
| 2017/0314597 | A1 * | 11/2017 | Somerfield | F16L 3/2431 |

\* cited by examiner

OR RELATING TO CONNECTING DEVICES

BACKGROUND OF THE INVENTION

This invention relates to connecting devices. This invention also relates to connecting arrangements comprising connecting devices and carriers. More particularly, but not exclusively, this invention relates to connecting devices for suspending articles from supports.

It is often necessary to suspend carriers from ceilings or roofs. One end of a wire or cable can be secured to a suitable securing point in the roof and the opposite end to a connecting device. The connecting device is attached to the carrier. The connecting device can have a tendency to twist relative to the carrier and eventually work itself loose.

BRIEF SUMMARY OF THE INVENTION

According to one aspect of this invention, there is provided an attaching arrangement for attaching a connecting device to a first article, the attaching arrangement being receivable through an opening in the first article; and the attaching arrangement comprising a locking arrangement for locking the connecting device to the first article, the locking arrangement comprising a detent formation configured to be received by an opening in the first article.

According to a further aspect of this invention, there is provided a connecting device for connecting a first article to an elongate second article, the connecting device comprising: a securing arrangement for securing the device to the elongate second article; and an attaching arrangement for attaching the connecting device to the first article, the attaching arrangement being receivable through an opening in the first article; the attaching arrangement comprising a locking arrangement for locking the connecting device to the first article, the locking arrangement comprising a detent formation configured to be received by an opening in the first article.

According to another aspect of this invention, there is provided a connecting arrangement comprising: a connecting device and a first article, the connecting device comprising a securing arrangement for securing the connecting device to an elongate second article; and an attaching arrangement for attaching the connecting device to the first article, the attaching arrangement being receivable through an opening in the first article; the attaching arrangement comprising a locking arrangement for locking the connecting device to the first article, the locking arrangement comprising a detent formation configured to be received by an opening in the first article.

According to another aspect of this invention, there is provided a method of connecting a first article to an elongate second article, the method comprising providing a connecting arrangement as described above, inserting the attaching arrangement through an opening in the first article and arranging the detent formation in an opening in the first article to lock the connecting device to the first article.

The first article may comprise a carrier. In one embodiment, the carrier may comprise a support, which may be elongate. The carrier may comprise and elongate strut. The elongate second article may comprise a cable, wire or other similar article.

The attaching arrangement may be rotatable relative to the first article to an attaching position to attach the connecting device to the first article. The detent formation may be receivable in the opening when the attaching arrangement is so rotated. The method may comprise rotating the attaching arrangement relative to the first article so that the detent formation is received in the opening in the first article.

The detent formation may comprise a resilient member. The resilient member may be receivable in the opening in the first article.

The resilient member may be substantially V shaped. The resilient member may have opposite arms forming the V. The arms may be resiliently deformable away from, and towards, each other.

The locking arrangement may include a mounting member for mounting the locking arrangement on the attaching arrangement. The mounting member may be attached to one of the arms.

The arm attached to the mounting member may move from a resiliently deformed position to a non-deformed position when the attaching arrangement is moved to the attaching position. The movement of said arm from the deformed position to a non-deformed position may be a movement of the resilient member from a deformed position to a non-deformed position.

The mounting member may define an aperture through which a part of the attaching arrangement can extend. The attaching arrangement may have a fastening element to fasten the attaching arrangement to the securing arrangement. The fastening element may extend through the aperture to mount the locking arrangement on the attaching arrangement.

The locking arrangement may further include a release tab attached to the other of said arms to facilitate moving the arms towards each other, for example to release the resilient member from the opening in which it is received. The method may comprise manipulating the tab to move said arm attached thereto from a non-deformed position to a deformed position to release the resilient member from the opening in which the resilient member is received.

The opening into which the resilient member is inserted may be the same as the opening through which the attaching arrangement is received. Alternatively, the opening into which the resilient member is inserted may be different from the opening through which the attaching arrangement is received.

The attaching arrangement may comprise an attaching member. The attaching member may comprise a first projecting portion for engaging the first article and a second projecting portion for insertion through the first article. When the second projecting portion is inserted through the first article, a region of the first article can be received between the first and second projecting portions, thereby attaching the connecting device to the first article.

The first projecting portion may engage a first face of said region of the first article. The second projecting portion may engage an opposite second face of said region of the first article.

In one embodiment of the connecting device for use with a first article defining an opening, the second projecting portion may be inserted through the opening in use.

The first article may comprise a main part, which may define an opening. The second projecting portion may be inserted through the opening, wherein when the second projecting portion is inserted through the opening, a region of the first article can be received between the first and second projecting portions, thereby attaching the connecting device to the first article.

The connecting arrangement may comprise a plurality of the connecting devices, which can be attached to the first article.

The aforesaid region of the first article may be received between the first and second projecting portions on rotating the attaching arrangement to an attaching position when the second projecting portion is inserted through the first article. The second projecting portion may extend across the first projecting portion.

The attaching member may further include a spacer portion extending between the first and second projecting portions. A gap may be defined between the first and second projecting portions.

The attaching arrangement may be rotated to the attaching position about an axis of rotation extending through the first and second projecting portions. When the attaching arrangement is rotated about the axis of rotation, a region of the first article may be received between the first and second projecting portions. The rotation of the attaching arrangement may be effected by rotation of the connecting device about the aforesaid axis of rotation.

The attaching member may have a fastening element to fasten the attaching arrangement to the securing arrangement. The fastening element may extend between the first projecting portion and the securing arrangement. The fastening element may be threaded to threadably cooperate with corresponding threads on the securing arrangement.

The first projecting portion may extend outwardly from the fastening element. The second projecting portion may extend outwardly from the spacer portion. The second projecting portion may extend from the spacer portion in opposite directions relative thereto.

The second projecting portion may have a leading surface and a securing region. The leading surface may be the first region of the second projecting portion to pass over the aforesaid region of the first article when the attaching arrangement is rotated to the attaching position. The second projecting portion may have an attaching surface to engage the first article when the attaching arrangement is in the attaching position.

The gap may be larger at the leading surface than at the attaching surface. The leading surface may taper to the attaching surface.

The first projecting portion may extend radially from the fastening element, and may be substantially circular. The second projecting portion may be substantially rectangular having a width greater than its length.

The opening in the first article may be elongate and may have a length greater than the length of the second projecting portion. The width of the opening in the first article may be greater than the width of the second projecting portion. The length of the second projecting portion may be greater than the width of the opening.

The spacer portion may have a stop formation to prevent rotation of the attaching arrangement in one direction. The stop formation may comprise a region of the spacer portion configured to engage the first article when the attaching arrangement is rotated in the aforesaid direction. The stop formation may comprise diagonally opposite regions of the spacer portion, the distance between said regions being greater than the width of the opening.

The spacer portion may have a curved edge to allow rotating of the attaching arrangement relative to the first article. The spacer portion may have diametrically opposed curved edges, wherein the diametrical distance between said curved edges is less than the width of the opening in the first article.

The securing arrangement may comprise any suitable securing arrangement for securing the article to the connecting device.

BRIEF DESCRIPTION OF SEVERAL VIEWS OF THE DRAWINGS

At least one embodiment of the invention will now be described by way of example only, with reference to the accompanying drawings, in which.

DETAILED DESCRIPTION OF THE INVENTION

Figure 1:
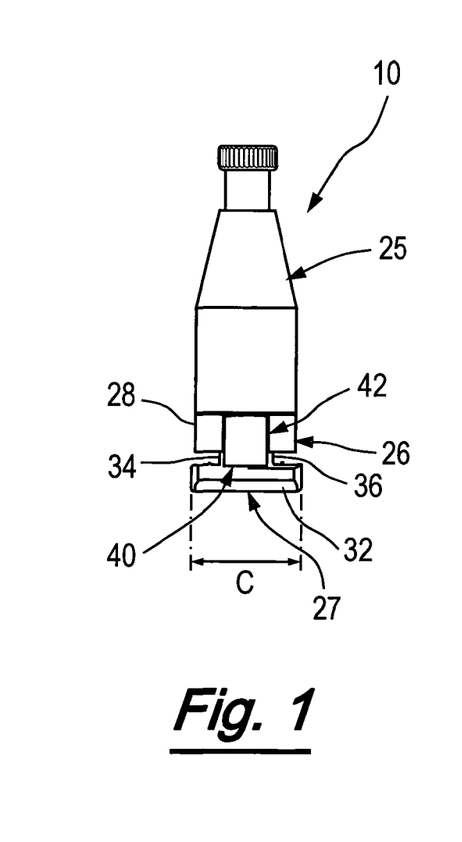
FIG. 1 is a front view of a connecting device.
Figure 2:
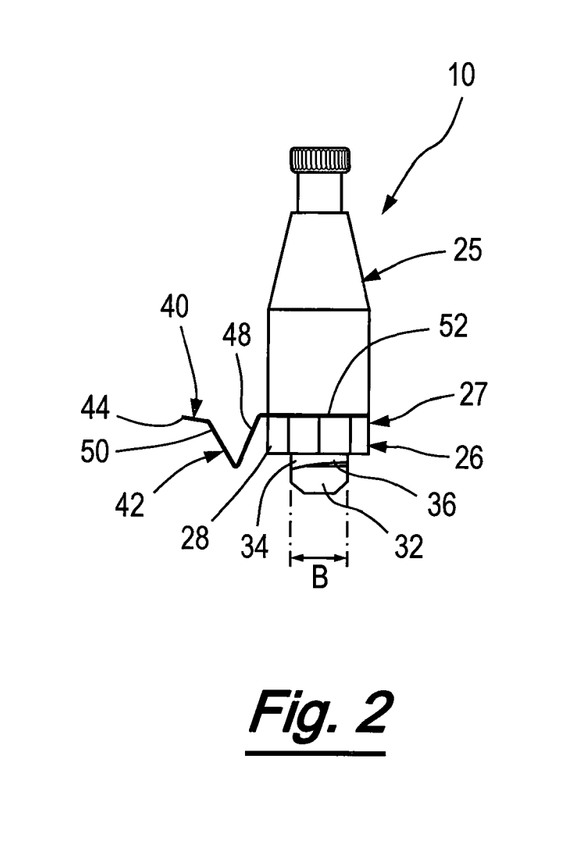
FIG. 2 is a side view of the connecting device shown in FIG. 1.
Figure 3:
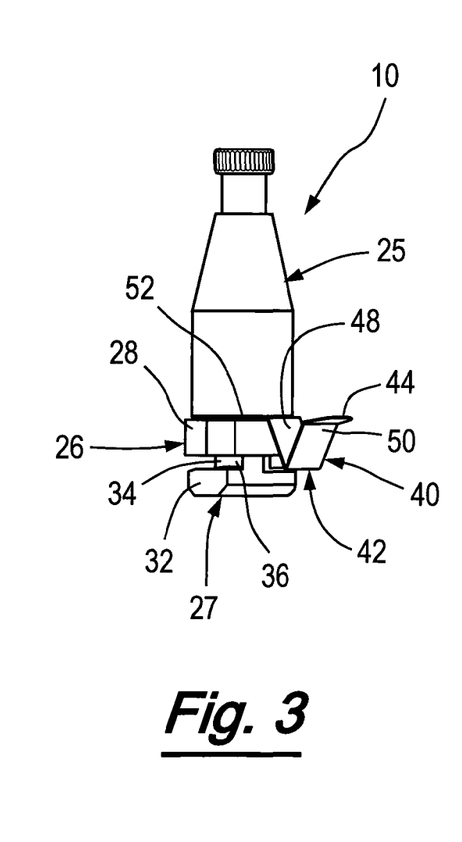
FIG. 3 is a perspective side view of the connecting device shown in FIG. 1.

FIGS. 1 to 3 show a connecting device 10 for use as part of a connecting arrangement 12 (see FIGS. 4A to 4C and 5A to 5C). The connecting arrangement 12 comprises the connecting device 10 and a first article in the form of a carrier comprising an elongate support 14.

The support 14 is in the form of an elongate strut comprising a main part 16 being formed of an elongate central strip 18 and two elongate substantially parallel transverse strips 20 extending from opposite edges of the central strip 18 so that the support 14 has an end profile that is substantially U shaped.

Openings in the form of elongate slots 22 are defined in the transverse strips 20 and in the central strip 18. The support 14 can be suspended from the roof or ceiling of a building so that items, for example pipes, can be attached thereto.

The connecting device 10 is provided to connect an elongate second article, in the form of a cable 24 to the support 14, and comprises a securing arrangement 25 for securing the cable 24 to the connecting device 10 and an attaching arrangement 26 for attaching the connecting device 10 to the support. The securing arrangement 25 can be any suitable securing arrangement, and one example is described below in more detail.

The attaching arrangement 26 comprises an attaching member 27 having a first projecting portion 28 with an upper surface 28A. The attaching arrangement 26 further includes a threaded fastening element 30 (see FIGS. 6, 9 and 10) extending from the upper surface 28A of the first projecting portion 28 into the securing arrangement 25.

Figure 6:
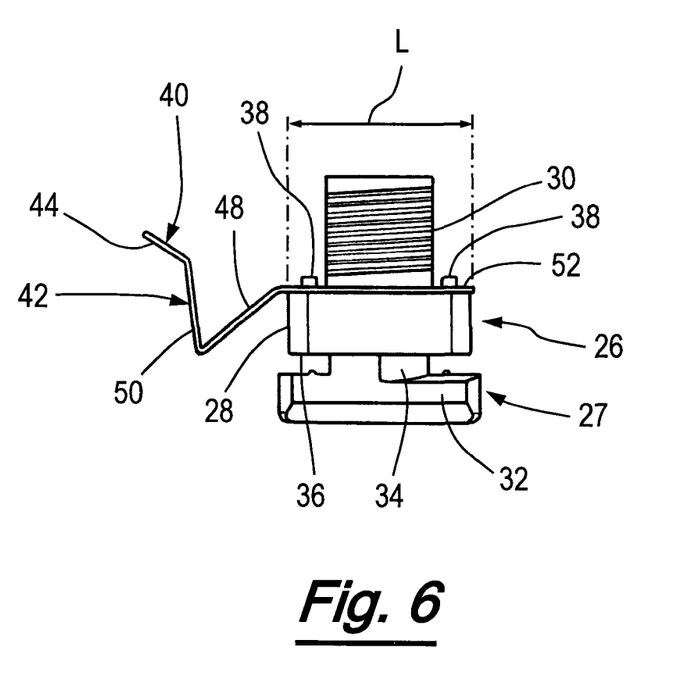
FIG. 6 is a side view of an attaching arrangement showing the locking arrangement mounted on the attaching member.
Figure 9:
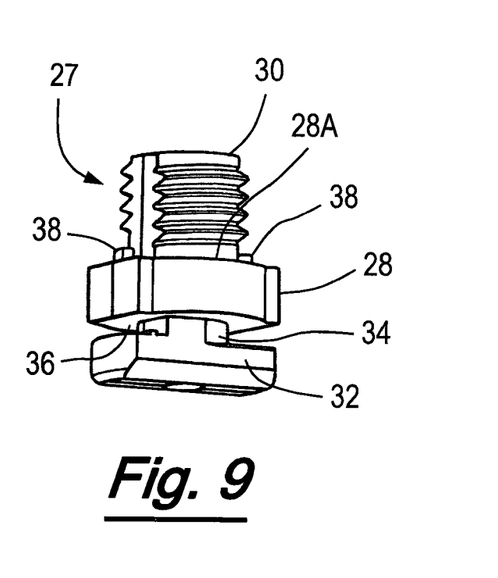
FIG. 9 is a perspective view of an attaching member, being part of the attaching arrangement.
Figure 10:
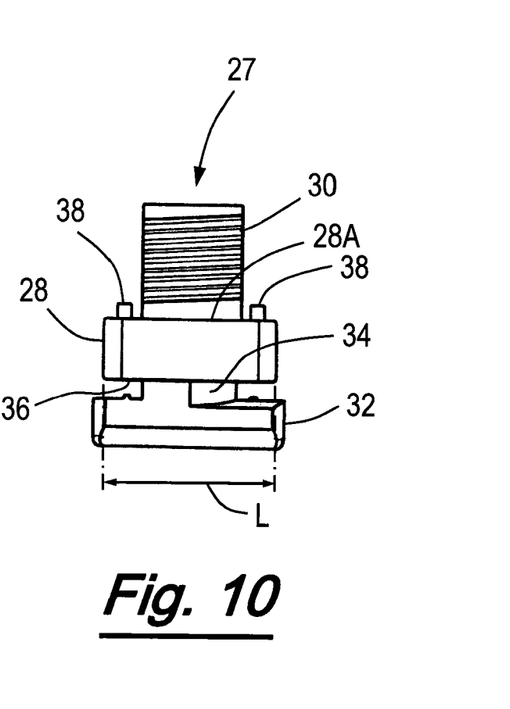
FIG. 10 is a side view of the attaching member.

The threaded fastening element 30 is screwed into a correspondingly threaded recess 31 in the securing arrangement 25, thereby fastening the securing arrangement 25 to the attaching member 27.

The first projecting portion 28 has a length L (see FIG. 1) which is greater than the width A of the slots 22 in the support 14. Thus, the first projecting portion projects beyond the opposite edges of the slot 22 when the attaching member 27 is in its attaching position, as explained below.

The attaching member 27 further includes a second projecting portion 32 and a spacer portion 34 between the first and second projecting portions 28, 32, whereby a gap 36 is defined between the first and second projecting portions 28, 32 on each side of the spacer portion 34. The size of each gap 36 is substantially equal to, or greater than, the thickness of the central strip 18 and the transverse strips 20, thereby allowing regions of the support 14 to be received in the gap 36.

The second projecting portion 32 has a substantially rectangular shape, and projects from the spacer portion 34 on opposite sides thereof across the first projecting portion 28. The second projecting portion 32 has a width B (see FIG. 2) that is less than the width A of the elongate slots 22 in the support 14, and a length C (see FIG. 1) that is greater than the width A of the elongate slots 22 in the support 14.

The attaching member 27 further includes upstanding lugs 38 on the upper surface 28A of the first projecting portion 28. The purpose of the lugs 38 is explained below.

The attaching arrangement 26 further includes a locking arrangement 40 (see FIGS. 7 and 8) for locking the connecting device 10 to the support 14. The locking arrangement 40 comprises a detent formation 42 and a release tab 44 for releasing the locking arrangement 40 from the support 14. The detent formation 42 is in the form of a V shaped resilient member. When the connecting arrangement 10 is in the attaching position in one of the openings 22, the detent formation 42 is received in the same opening 22.

Figure 7:
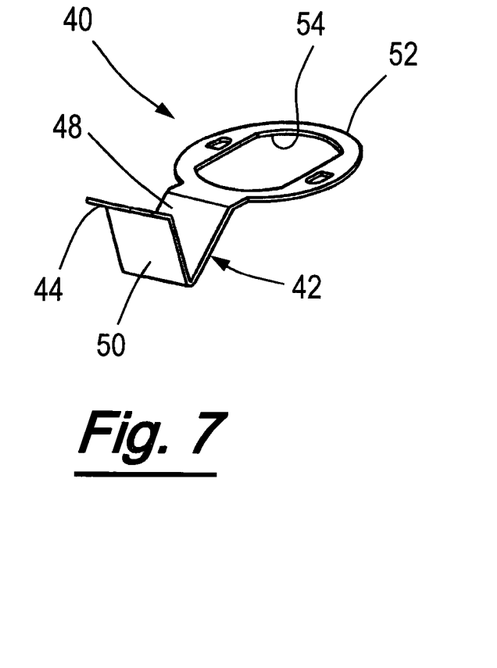
FIG. 7 is a perspective view of a locking arrangement, being part of the attaching arrangement.
Figure 8:
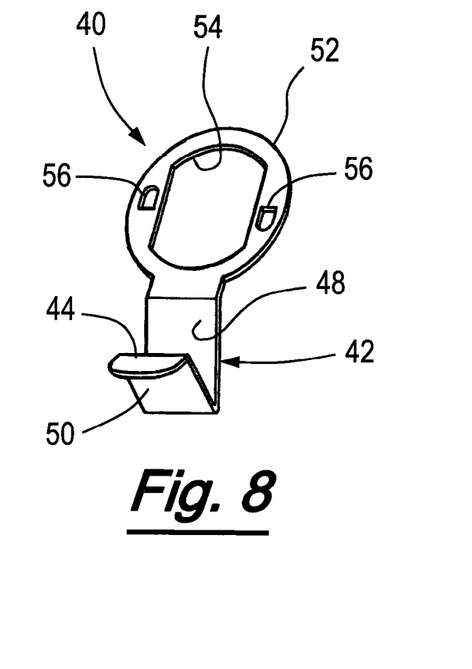
FIG. 8 is a further perspective view of the locking arrangement.

The detent formation 42 comprises opposite arms 48, 50 forming the V. One of the arms 48 is attached to a mounting member 52. The other arm 50 is attached to the release tab 44. The mounting member 52 is provided to mount the locking arrangement 40 on the attaching arrangement 26.

The mounting member 52 is substantially flat and defines a substantially oval main aperture 54 through which the fastening element 30 on the attaching arrangement 26 is received. The mounting member also defines a pair of opposite subsidiary apertures 56 to receive the lugs 38, thereby locating the mounting member on the first projecting portion 28 when the fastening element 30 is received in the main aperture 54. Thus, when the fastening element 30 is screwed into the threaded recess 31 to fasten the attaching arrangement 26 to the securing arrangement, the mounting member 52 is held between the securing arrangement 25 and the attaching arrangement 26. This securely mounts the locking arrangement 40 on the attaching arrangement 26.

Figure 4A:
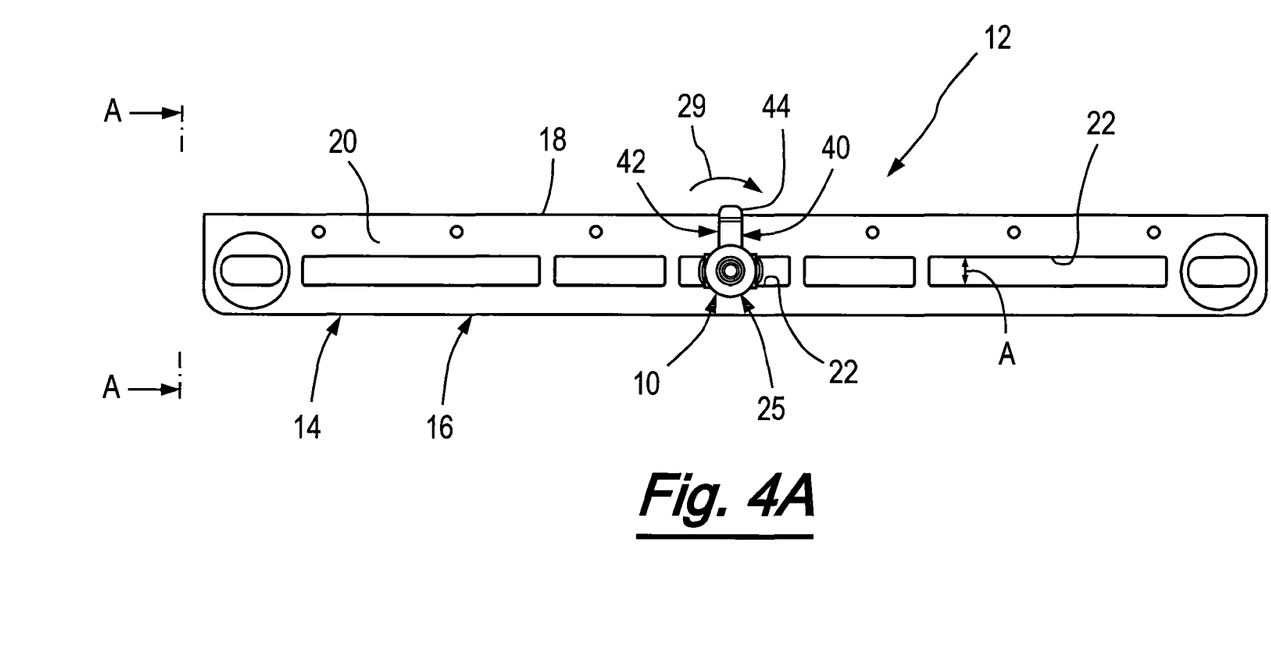
FIGS. 4A to 4C are top plan views showing the steps of attaching the connecting device to a first article to form a connecting arrangement.
Figure 4B:
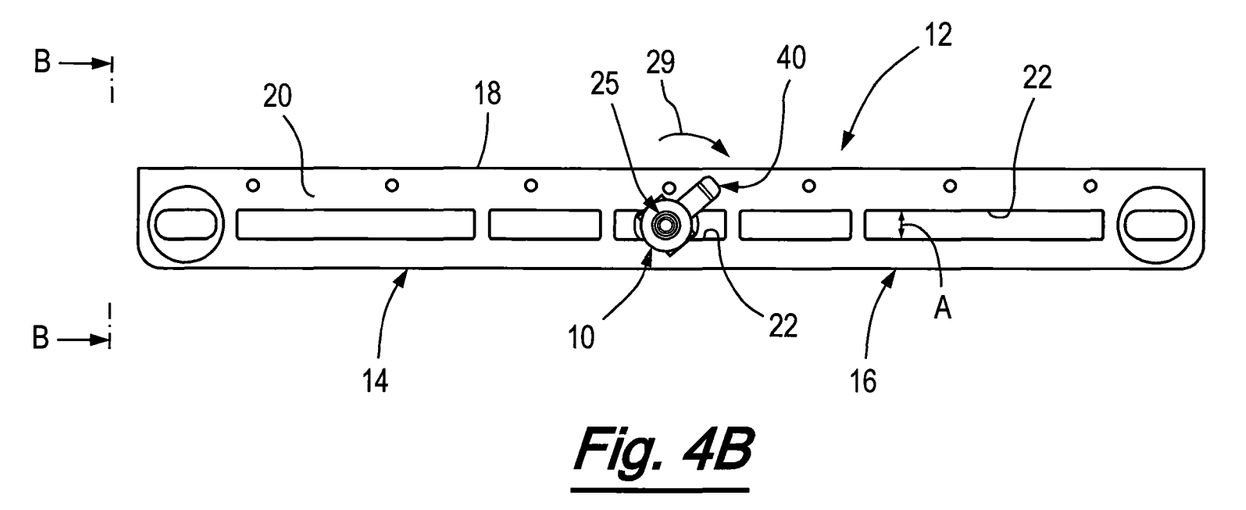
Figure 5A:
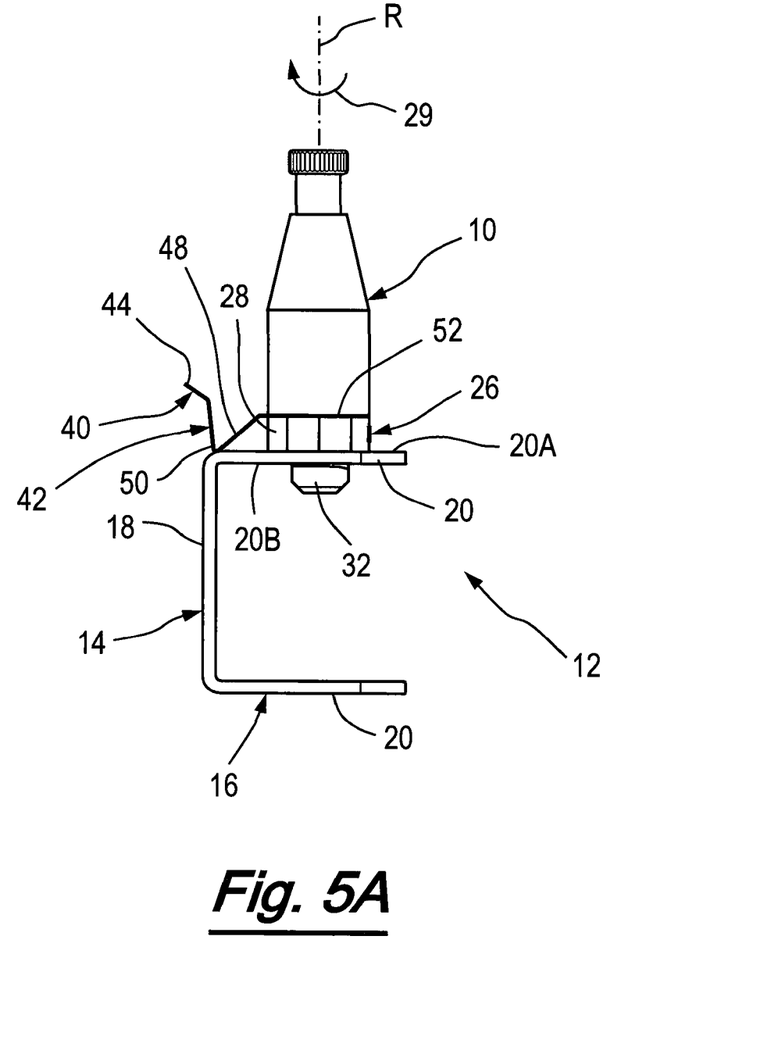
FIG. 5A is a view along the lines A-A in FIG. 4A.
Figure 5B:
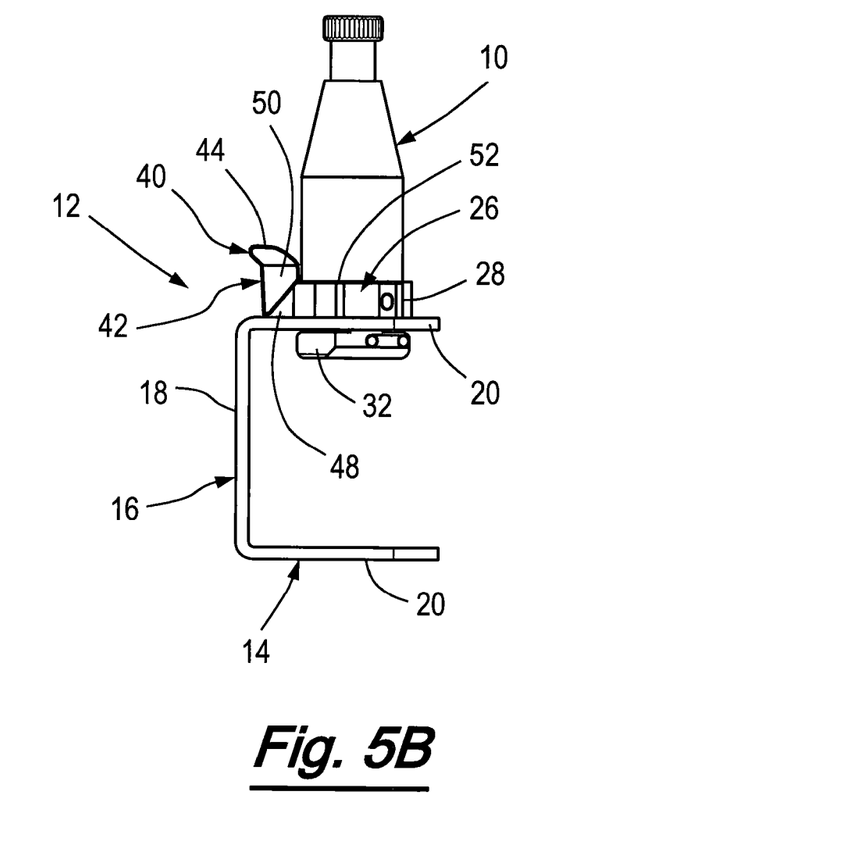
FIG. 5B is a view along the lines B-B in FIG. 4B.

In use, the attaching arrangement 26 is inserted into one of the elongate slots 22, for example, in one of the transverse strips 20 of the support 14, so that the first and second projecting portions 28, 32 are disposed on opposite sides of the transverse strip 20 (see FIGS. 4A and 5A). In this position, the spacer portion 34 extends through the slot 22, and the second projecting portion 32 extends parallel to the elongate slot 22, as shown in FIGS. 4A and 5A. In this position, the resilient member 42 of the locking arrangement 40 engages the top surface of the transverse strip 20, and the arm 48 is deformed upwardly, as shown in FIG. 5A.

Figure 4C:
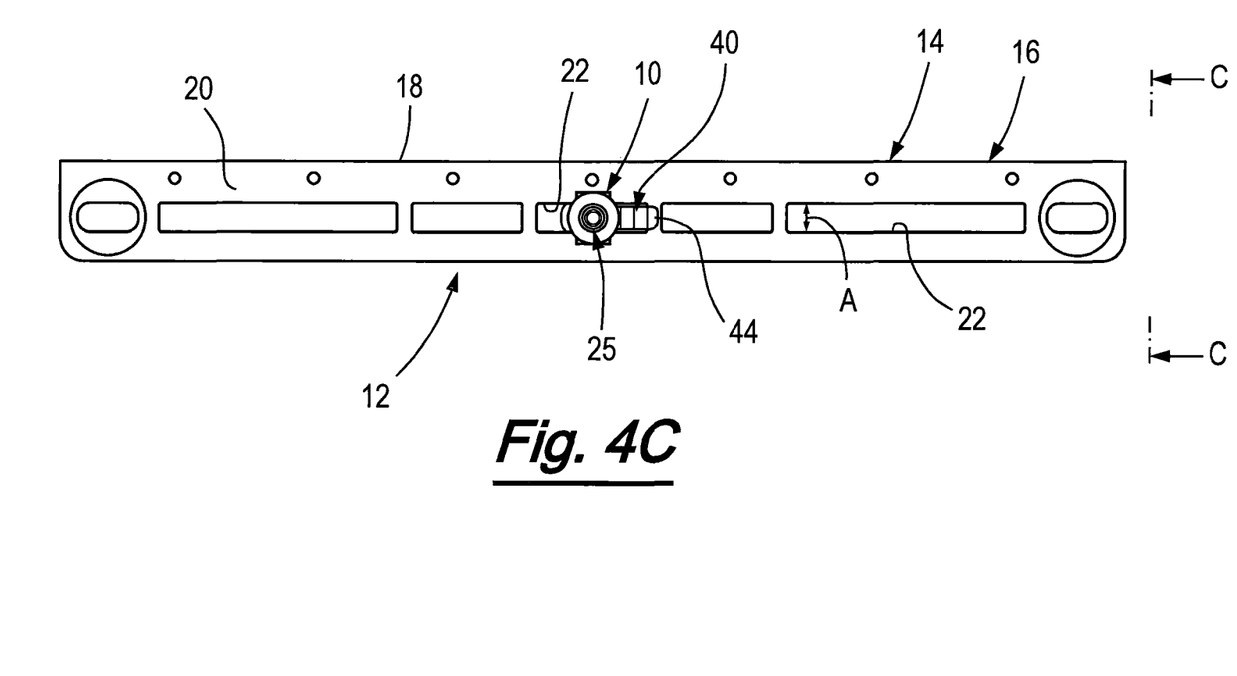
Figure 5C:
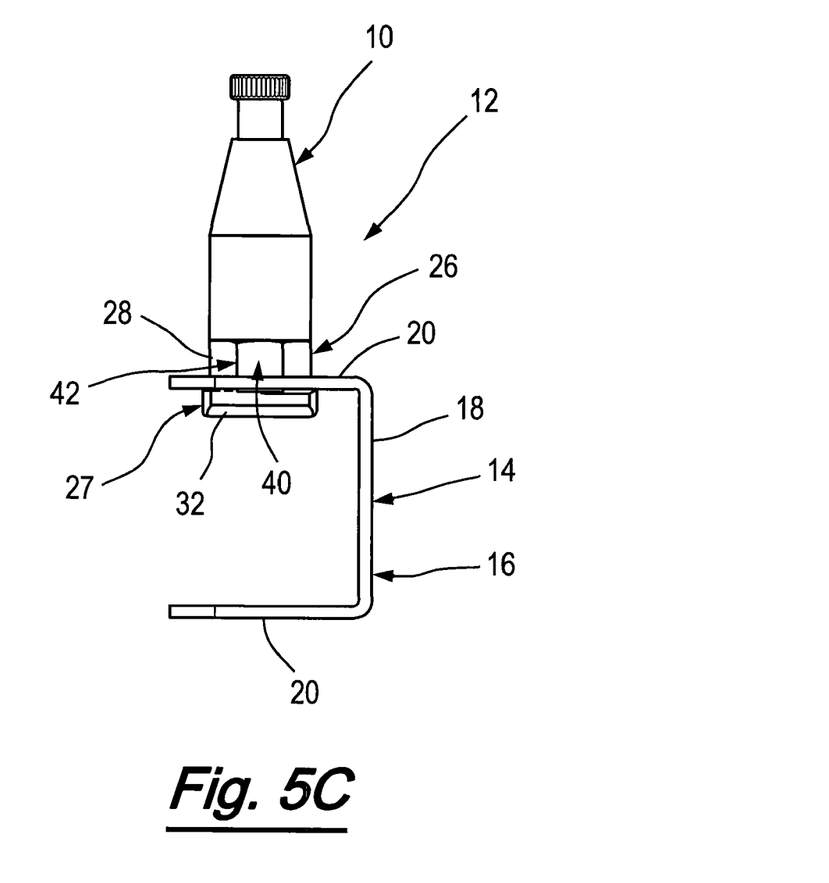
FIG. 5C is a view along the lines C-C in FIG. 4C.

The securing device 25 is rotated about the axis of rotation R in the direction indicated by the arrow 29 to an attaching position (see FIGS. 4C and 5C). The securing arrangement 25 is fixedly mounted on the attaching arrangement 26 by the fastening element 30. Thus, rotating the securing device 25 about the axis R also rotates the attaching arrangement 26 in the same direction to the attaching position. In the attaching position, the second projecting portion 32 is disposed across the slot 22 and projects beyond the edges of the slot 22.

When the connecting device 10 is rotated as described above, the second projecting portion 32 is moved to a position in which it extends at right angles to the elongate slot 22, as shown in FIGS. 4C and 5C. During the rotation of the connecting device 10, the V shaped resilient member 42 is moved to the position shown in FIGS. 4C and 5C, in which it is received in the slot 22.

In the position shown in FIGS. 4C and 5C, the V shaped resilient member 42 moves to a non-deformed position as the resilient member 42 is received in the slot 22. The non-deformed position of the resilient member 42 is shown in FIG. 2. The connecting device 10 is prevented from further rotation by the V shaped resilient member engaging the edges of the slot 22, thereby preventing inadvertent release of the attaching arrangement 26 from the support 14.

If it is desired to release the attaching arrangement 26 from the slot 22, the user can engage the tab 44 and move the resilient member 42 to its deformed position shown in FIG. 5A, thereby removing the resilient member 42 from the slot 22. The connecting device 10 can then be rotated to remove the attaching arrangement 26 from the slot 22.

Figure 11:
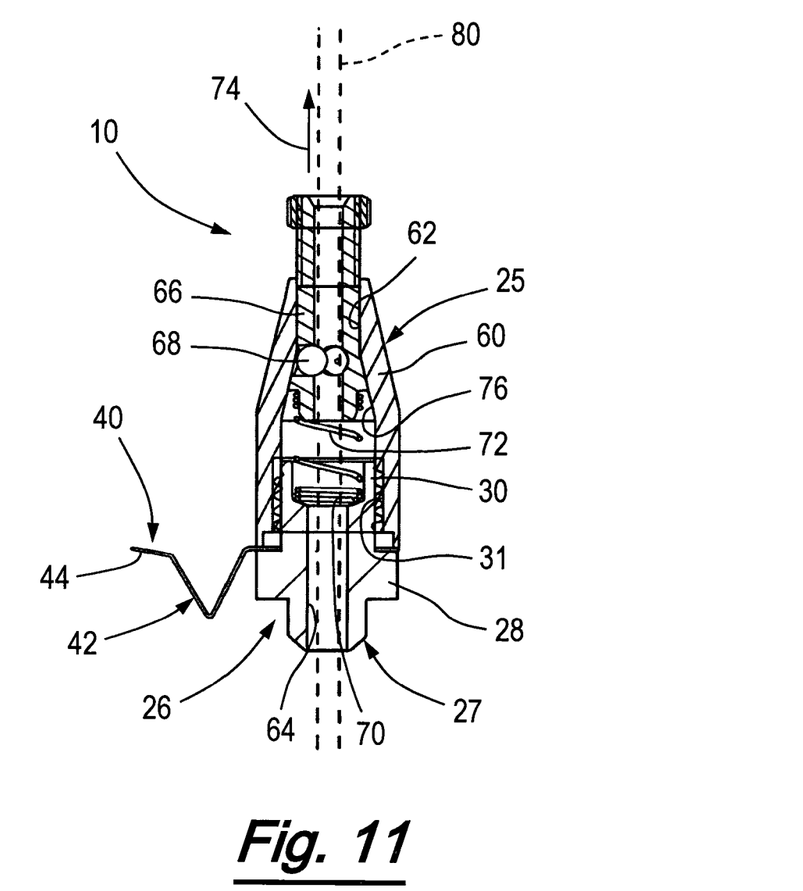
FIG. 11 is a sectional side view of the connecting device.

FIG. 11 is a sectional view of the connecting device 10, showing an example of the securing arrangement 25 in more detail. The securing arrangement 25 comprises a body 60 defining a first through bore 62. The attaching member 27 defines a second through bore 64 aligned with the first through bore 62 when the attaching arrangement 27 is fastened to the securing arrangement 25, as shown in FIG. 11.

The securing device 25 further includes clamping mechanism comprising a carriage 66 carrying a plurality of clamping members in the form of balls 68. The body further includes a shoulder 70 extending around the first through bore 62. The clamping mechanism includes a spring 72 extends from the shoulder to the carriage to urge the carriage in the direction indicated by the arrow 74. The first through bore 62 tapers inwardly at a tapering region 76. Thus, the urging of the carriage in the direction indicated by the arrow 74 urges the balls 68 towards each other.

A cable 80 can be inserted through the first through bore 62 in the direction opposite to the arrow 74. The cable 80 engages the balls 68 and pushes the carriage 66 also in the direction opposite to the arrow 74, thereby moving the balls 68 away from each other. Eventually, the carriage reaches a position at which the cable 80 can be pushed past the balls 68 and threaded through the first through bore 62 and through the second through bore 64. Pulling the cable 80 in the direction of the arrow 74 causes the carriage 66 to be urged in the direction of the arrow 74, thereby causing the balls 68 to be urged inwardly towards each other to clamp the cable 80. The cable 80 is thus secured to the securing arrangement 25.

The carriage 66 includes a button portion 76 which can be pressed inwardly in the direction opposite to the arrow 74, thereby moving the carriage 66 in the direction opposite to the arrow 74. This releases the balls 68 from the cable 80 and allows the position of the cable 80 within the securing arrangement 25 to be adjusted.

The cable 80 can be attached to a suitable securing point in the roof of a building to suspend the connecting device and the support 14 attached to the attaching arrangement 26.

A clamping mechanism similar to the mechanism described above is disclosed in patent specification No. U.S. Pat. No. 5,417,400 A.

Figure 12:
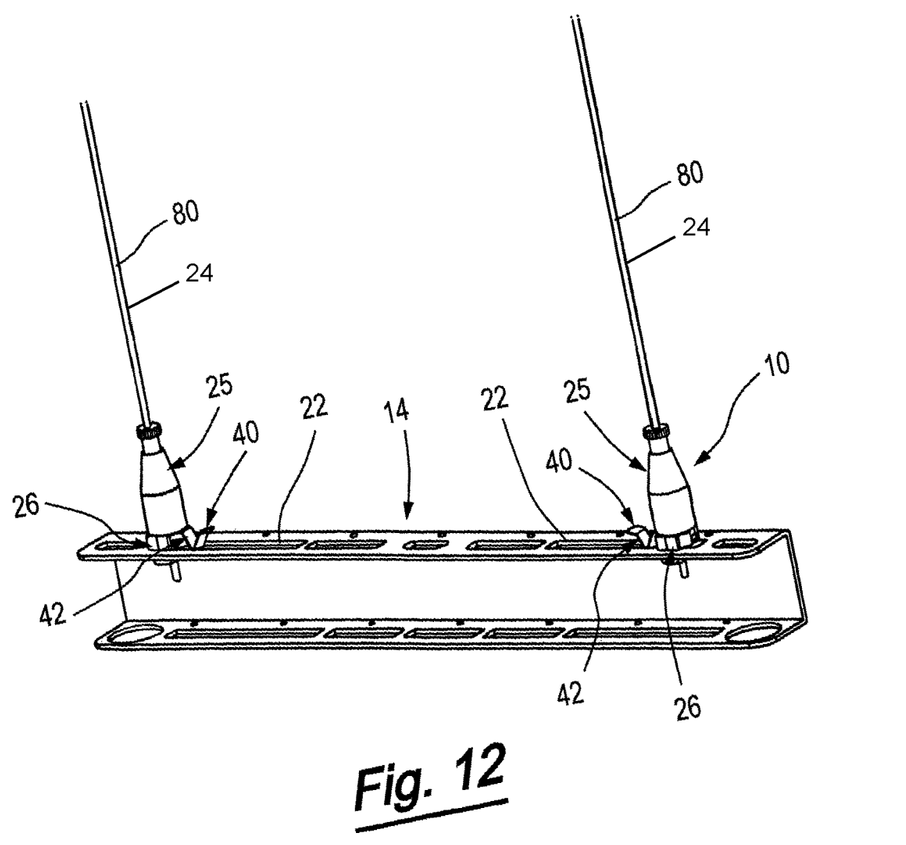
FIG. 12 is an example of a support suspended by two cables.

FIG. 12 shows an example of a support 14 suspended by two cables 80. The cables 80 could be attached at their upper ends to appropriate securing points (not shown) in the roof of a building.

The lower end regions of the cables 80 are secured to securing arrangements 25 of respective connecting devices 10 in the manner described above. Each of the connecting devices 10 is attached to the support 14. The second projecting portions 32 of each attaching arrangement 26 are received through a respective one of the slots 22, and the detent formations 42 are received in the slots 22, thereby locking the connecting devices 10 to the support 14 in the positions shown in FIG. 12.

Pipework or other suitable apparatus can then be attached to the support 14.

There is thus described a connecting device 10 having an attaching arrangement 26 that can be attached to a support 14 and suspended from a roof of a building, the connecting device 10 being locked in attachment to the support 14 by a locking arrangement 26.

Various modifications can be made without departing from the scope of the invention. For example, other suitable types of securing arrangement could be used instead of the securing arrangement 25.

The invention claimed is:

1. An attaching arrangement for attaching a connecting device to a first article, the attaching arrangement comprising:
   an attaching member receivable through an opening in the first article; and
   a locking arrangement comprising a detent formation, wherein the detent formation comprises a resilient member, the resilient member being receivable in said opening in the first article to lock the connecting device to the first article, and the resilient member being substantially V shaped, having opposite arms forming the V;
   wherein the locking arrangement further includes a mounting member defining an aperture, the mounting member being attached to one of the arms;
   wherein the attaching arrangement has a fastening element extending through the aperture; and
   wherein the locking arrangement further includes a release tab attached to the other of said arms to facilitate moving the arms towards each other;
   wherein the attaching member comprises a first projecting portion for engaging the first article and a second projecting portion for insertion through the first article;
   wherein the attaching arrangement is rotatable relative to the first article to an attaching position to attach the connecting device to the first article, whereby when the attaching arrangement is so rotated, a region of the first article can be received between the first and second projecting portions;
   wherein the second projecting portion has a leading surface, the leading surface being the first region of the second projecting portion to pass over the aforesaid region of the first article when the attaching arrangement is rotated to the attaching position, and wherein the second projecting portion has an attaching surface to engage the first article when the attaching arrangement is in the attaching position;
   wherein the attaching member further includes a spacer portion extending between the first and second projecting portions, and a gap is defined between the first and second projecting portions, the gap being larger at the leading surface than at the attaching surface, the leading surface converging toward the attaching surface.

2. An attaching arrangement according to claim 1, wherein the arms are resiliently deformable away from, and towards, each other, wherein the arm attached to the mounting member is movable from a resiliently deformed position to a non-deformed position when the attaching arrangement is moved to an attaching position, the movement of said arm from the deformed position to a non-deformed position being a movement of the resilient member from a deformed position to a non-deformed position.

3. An attaching arrangement according to claim 1, wherein the fastening element extends from the first projecting portion to fasten the attaching arrangement to a securing arrangement.

4. An attaching arrangement according to claim 3, wherein the fastening element is threaded to threadably cooperate with corresponding threads on the securing arrangement.

5. An attaching arrangement according to claim 1, wherein the first projecting portion engages a first face of said region of the first article, and the second projecting portion engages an opposite second face of said region of the first article.

6. An attaching arrangement according to claim 1, wherein the first and second projecting portions extend outwardly from the fastening element, the second projecting portion extending from the spacer portion in opposite directions relative thereto.

7. An attaching arrangement according to claim 6, wherein the first projecting portion extends radially from the fastening element and is substantially circular, and wherein the second projecting portion is substantially rectangular having a width greater than its length.

8. An attaching arrangement according to claim 1, wherein the second projecting portion extends across the first projecting portion.

9. An attaching arrangement according to claim 1, wherein the spacer portion has a stop formation to prevent rotation of the attaching arrangement in one direction, the stop formation comprising diagonally opposite regions of the spacer portion, the distance between said regions being greater than the width of the opening.

10. An attaching arrangement according to claim 9, wherein the stop formation comprises a region of the spacer portion configured to engage the first article when the attaching arrangement is rotated in the aforesaid direction.

11. An attaching arrangement according to claim 1, wherein the spacer portion has a curved edge to allow rotating of the attaching arrangement relative to the first article, and the spacer portion has diametrically opposed curved edges, wherein the diametrical distance between said curved edges is less than the width of the opening in the first article.

12. A connecting device for connecting a first article to an elongate second article, the connecting device comprising:
   an attaching arrangement for attaching the connecting device to the first article, the attaching arrangement comprising:
   an attaching member receivable through an opening in the first article; and
   a locking arrangement comprising a detent formation, wherein the detent formation comprises a resilient member, the resilient member being receivable in said opening in the first article to lock the connecting device to the first article, and the resilient member being substantially V shaped, having opposite arms forming the V;

wherein the locking arrangement further includes a mounting member defining an aperture, the mounting member being attached to one of the arms;

wherein the attaching arrangement has a fastening element extending through the aperture; and wherein the locking arrangement further includes a release tab attached to the other of said arms to facilitate moving the arms towards each other;

a securing arrangement for securing the connecting device to the elongate second article, the securing arrangement being fastened to the attaching arrangement by the fastening element.

13. A connecting arrangement comprising a connecting device and a first article, the connecting device comprising:

an attaching arrangement for attaching the connecting device to the first article, the attaching arrangement comprising:

an attaching member receivable through an opening in the first article; and a locking arrangement comprising a detent formation, wherein the detent formation comprises a resilient member, the resilient member being receivable in said opening in the first article to lock the connecting device to the first article, and the resilient member being substantially V shaped, having opposite arms forming the V;

wherein the locking arrangement further includes a mounting member defining an aperture, the mounting member being attached to one of the arms;

wherein the attaching arrangement has a fastening element extending through the aperture; and wherein the locking arrangement further includes a release tab attached to the other of said arms to facilitate moving the arms towards each other; and the connecting arrangement further including a securing arrangement for securing the connecting device to an elongate second article, the securing arrangement being fastened to the attaching arrangement by the fastening element.

14. A connecting arrangement according to claim 13, comprising a plurality of the connecting devices, which can be attached to the first article.

15. A connecting arrangement according to claim 13, wherein the first article comprises an elongate support.

\* \* \* \* \*

UNITED STATES PATENT AND TRADEMARK OFFICE
CERTIFICATE OF CORRECTION

PATENT NO. : 11,572,913 B2
APPLICATION NO. : 16/307872
DATED : February 7, 2023
INVENTOR(S) : Robert Hepworth It is certified that error appears in the above-identified patent and that said Letters Patent is hereby corrected as shown below:

On the Title Page

Item (54) and in the Specification, Column 1, Line 1:
The title should be "IMPROVEMENTS IN OR RELATING TO CONNECTING DEVICES"

Signed and Sealed this
Twenty-first Day of March, 2023

Katherine Kelly Vidal
*Director of the United States Patent and Trademark Office*